United States Patent
Ahmadi et al.

(10) Patent No.: US 11,228,896 B2
(45) Date of Patent: Jan. 18, 2022

(54) AUTHORIZATION OF ROAMING FOR NEW RADIO SUBSCRIBERS VIA AN ALTERNATIVE RADIO ACCESS TECHNOLOGY

(71) Applicant: Verizon Patent and Licensing Inc., Arlington, VA (US)

(72) Inventors: Hossein M. Ahmadi, Parsippany, NJ (US); Sudhakar Reddy Patil, Flower Mound, TX (US); Violeta Cakulev, Milburn, NJ (US); Robert Avanes, Roanoke, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 177 days.

(21) Appl. No.: 16/577,534

(22) Filed: Sep. 20, 2019

(65) Prior Publication Data
US 2021/0092586 A1 Mar. 25, 2021

(51) Int. Cl.
*H04W 12/06* (2021.01)
*H04W 8/12* (2009.01)
(Continued)

(52) U.S. Cl.
CPC ............ *H04W 8/12* (2013.01); *H04W 8/20* (2013.01); *H04W 12/06* (2013.01); *H04W 76/11* (2018.02)

(58) Field of Classification Search
CPC ......... H04W 8/12; H04W 76/11; H04W 8/20; H04W 12/06; H04W 12/08; H04W 8/16; H04W 48/18; H04W 8/02; H04W 48/08; H04W 60/04; H04W 76/18; H04W 60/00; H04W 4/02; H04W 4/24; H04W 12/069; H04W 84/042; H04W 8/06; H04W 12/02; H04W 12/041; H04W 12/033; H04W 8/04; H04L 47/24; H04L 45/24; H04L 47/193;
(Continued)

(56) References Cited

U.S. PATENT DOCUMENTS

| | | | |
|---|---|---|---|
| 2009/0117876 A1* | 5/2009 | Inoue | ................ H04W 12/069 455/411 |
| 2013/0171974 A1* | 7/2013 | Bae | .................... H04L 65/1083 455/411 |

(Continued)

*Primary Examiner* — Hardikkumar D Patel

(57) ABSTRACT

A roaming platform is disclosed herein. The roaming platform may receive, via a first communication protocol, an authentication request associated with a user equipment (UE), wherein the UE is subscribed to communicate via a first radio access technology of a home network, and wherein the authentication request is associated with enabling the UE to communicate via a visitor network that utilizes a second radio access technology. The roaming platform may identify an identifier associated with the UE in the authentication request. The roaming platform may determine, based on the identifier, a serving component of the home network that is configured to serve the UE. The roaming platform may obtain, from the serving component, authentication information associated with the UE, wherein the authentication information is obtained via a second communication protocol. The roaming platform may provide, based on the authentication information, an authentication response to the authentication request.

20 Claims, 9 Drawing Sheets

(51) Int. Cl.
*H04W 76/11* (2018.01)
*H04W 8/20* (2009.01)

(58) Field of Classification Search
CPC . H04L 69/14; H04L 65/1073; H04L 65/1016; H04L 63/0876; H04L 63/0442; H04L 63/083; H04L 63/06; H04L 65/1083; H04M 15/8228; H04M 15/57; H04M 15/8038

See application file for complete search history.

(56) References Cited

U.S. PATENT DOCUMENTS

| | | | | |
|---|---|---|---|---|
| 2018/0324585 | A1* | 11/2018 | Nair | H04L 63/06 |
| 2018/0352528 | A1* | 12/2018 | Kunz | H04W 8/12 |
| 2020/0404584 | A1* | 12/2020 | Bonnet | H04W 48/08 |
| 2021/0058329 | A1* | 2/2021 | Perras | H04L 45/24 |

* cited by examiner

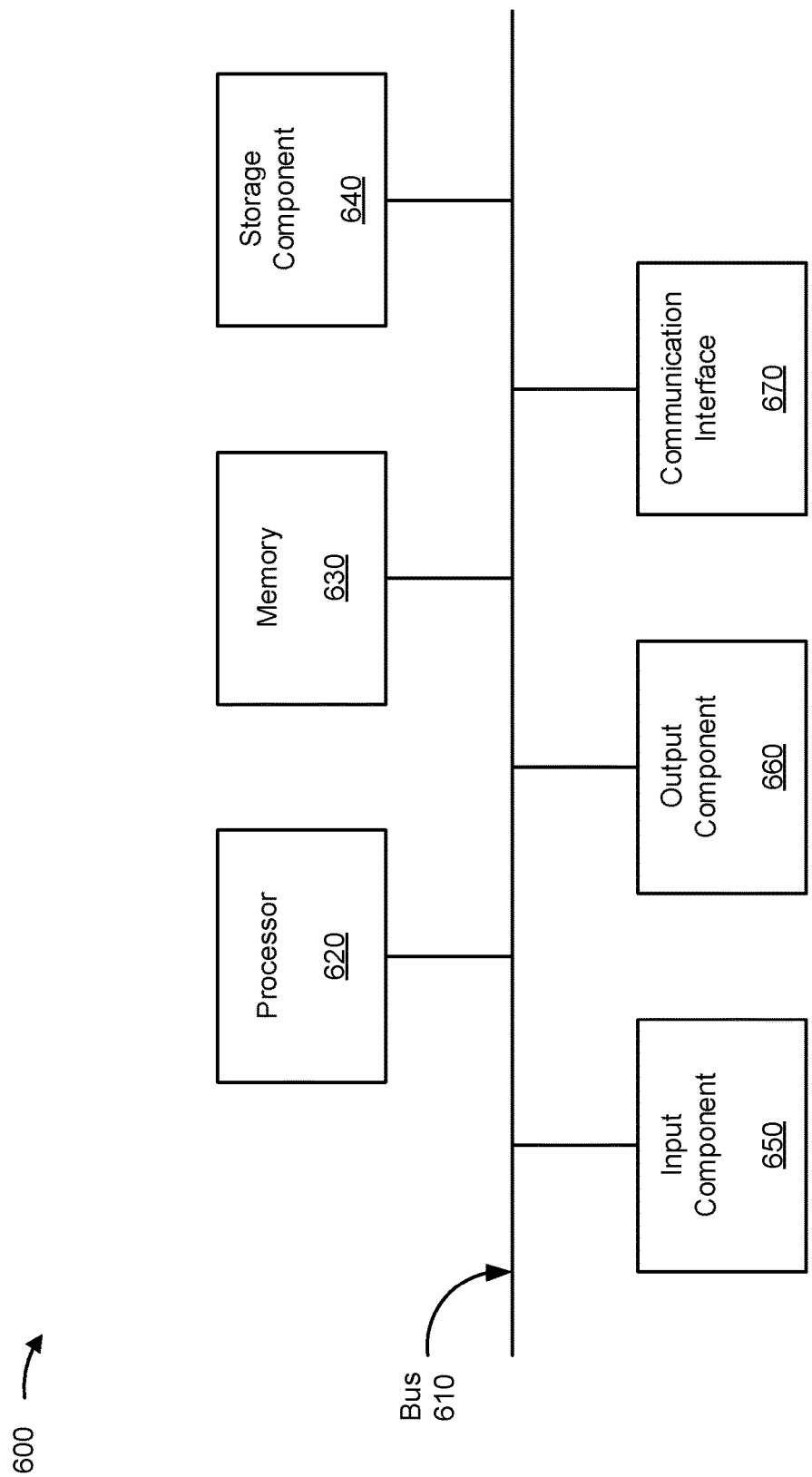

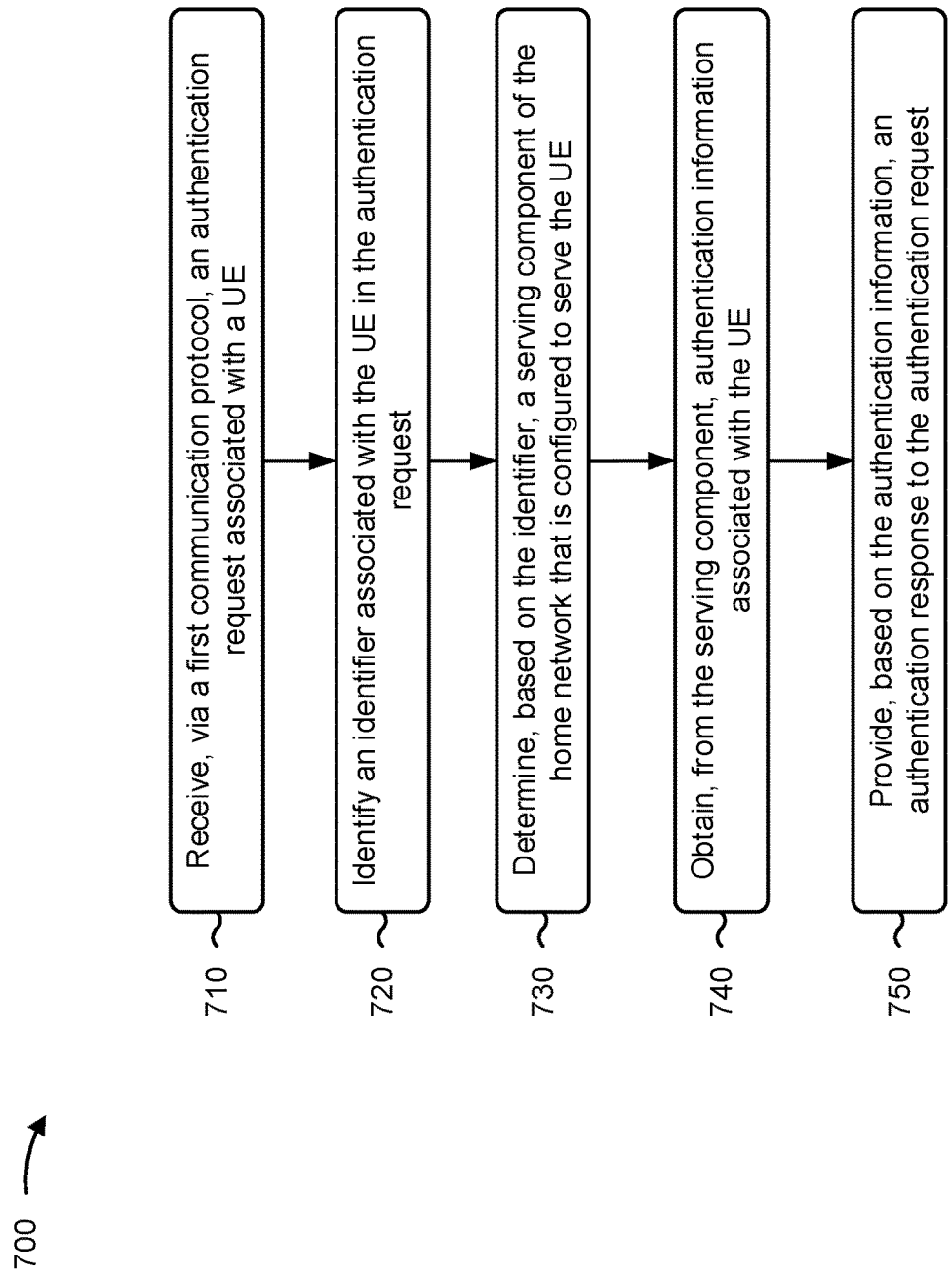

AUTHORIZATION OF ROAMING FOR NEW RADIO SUBSCRIBERS VIA AN ALTERNATIVE RADIO ACCESS TECHNOLOGY

BACKGROUND

5G/New Radio (NR) is a next generation global wireless technology. NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

BRIEF DESCRIPTION OF THE DRAWINGS

FIG. 6 is a diagram of example components of one or more devices of FIG. 4.

FIG. 7 is a flowchart of an example process for authorizing roaming for new radio subscribers via an alternative radio access technology.

DETAILED DESCRIPTION OF PREFERRED EMBODIMENTS

Figure 1:
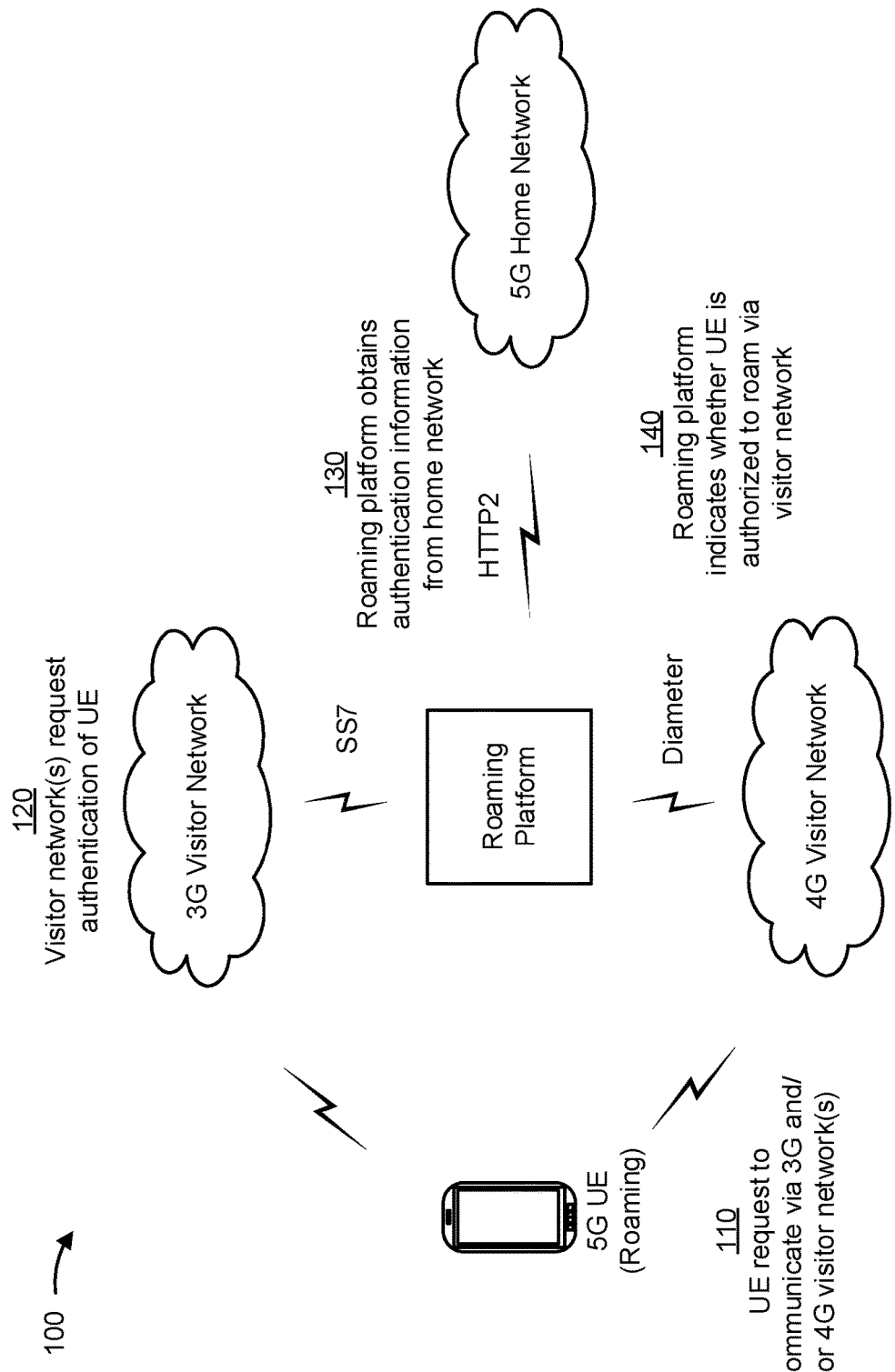
FIG. 1 is a diagram of an example implementation described herein.

The following detailed description of example implementations refers to the accompanying drawings. The same reference numbers in different drawings may identify the same or similar elements.

In many instances, a user equipment (UE) is associated with a home network. For example, the UE may be subscribed to the home network and/or be configured to communicate via the home network via a service agreement between a user of the UE and a service provider of the home network. If the UE is not within range of a base station of the home network, but is within range of a visitor network (e.g., a network to which the UE is not registered), the UE may attempt to establish a communication session via the visitor network (which may be referred to herein as "roaming"). In such cases, the visitor network and the home network may communicate to authorize the UE to establish the communication session via the visitor network. For example, the visitor network may request the home network to verify that the UE is subscribed to the home network and/or that the UE is authorized to roam via the visitor network. In such cases, the home network may perform a lookup operation to verify that the UE is authorized to establish a communication session via the visitor network. Via the lookup operation, the home network may verify whether the UE is authorized to communicate via the visitor network according to a subscriber agreement associated with the UE and the home network that authorizes roaming service via the visitor network. The home network may then communicate with the visitor network to indicate whether the UE can establish the communication session via the visitor network.

However, in many instances, the UE may be configured to communicate via and/or may be subscribed to a home network that utilizes a different radio access technology (RAT) than the visitor network. In such instances, the visitor network accesses a corresponding core network of the home network that is associated with a same RAT as the visitor network. For example, if the visitor network utilizes a 3G RAT (e.g., a Global System for Mobile Communication (GSM) technology), the visitor network may communicate with a 3G core network component of the home network to request authorization to permit the UE to communicate via the visitor network. As another example, if the visitor network utilizes a 4G RAT (e.g., a Long-Term Evolution (LTE) technology), the visitor network may communicate with a 4G core network component of the home network to request authorization to permit the UE to communicate via the visitor network. Accordingly, using previous techniques, if the UE is subscribed to use a RAT (e.g., new radio (NR) technology) that is not available to the visitor network (and/or that is not utilized by a base station of the visitor network that received the communication from the UE), the visitor network may not be able to verify whether the UE is authorized to communicate via the visitor network. More specifically, the visitor network would not be able to communicate with a RAT component that is associated with the UE (e.g., a component of a core network to which the UE is subscribed to utilize for communication via the home network). Therefore, in previous techniques, the visitor network may not authorize the UE to communicate via the visitor network, thus preventing the UE from having the ability to establish or engage in a communication session, preventing the UE from being able to access any network, and/or preventing the UE from being accessed by any other devices (e.g., because the UE is outside of range of the home network or other roaming networks).

According to some implementations described herein, a roaming platform of a home network is configured to authorize a UE to communicate via a visitor network (e.g., roam and/or engage in roaming communication sessions) when the UE is subscribed to communicate via the home network using NR and the visitor network does not utilize NR. For example, the roaming platform may include an interworking function (IWF) component of a NR core network of the home network that determines and/or indicates, based on communications with another core network of the home network, whether the UE is authorized to communicate via the visitor network. In some implementations, the roaming platform (and/or IWF) may receive an authentication request associated with a UE via a first communication protocol (e.g., a Signaling System Number 7 (SS7) protocol, a diameter protocol, and/or the like), determine a serving component (e.g., a unified data management (UDM) component) associated with the UE and the home network, request the serving component to provide authentication information for the UE, receive the authentication information via a second communication protocol (e.g., hypertext transfer protocol (HTTP)), and transmit an authorization response to the visitor network to permit the visitor network to manage communication of the UE. In this way, the roaming platform may be configured to authorize roaming for new radio (NR) subscribers of a home network, enabling a UE to communicate via a visitor network that utilizes a different RAT. Furthermore, by enabling the UE to communicate via the visitor network, as described herein, the roaming platform may conserve computing resources (e.g., processing resources, memory resources, and/or the like) and/or network resources (e.g., communication resources, and/or the like) that may otherwise be wasted in unsuccessfully attempting to authorize the UE to communicate via the visitor network using previous techniques.

FIG. 1 is a diagram of an example implementation 100 described herein. Example implementation 100 includes a UE (shown as "5G UE"), a roaming platform, a 3G visitor network, a 4G visitor network, and a 5G home network. In example implementation 100, the UE is subscribed to the 5G home network. Further, in example implementation 100, the 3G visitor network utilizes a 3G RAT, the 4G visitor network utilizes a 4G RAT, and the 5G home network utilizes a 5G RAT. Correspondingly, as used herein, a "5G UE" is a UE subscribed to use a 5G RAT, a "4G UE" is a UE subscribed to use a 4G RAT, and a "3G UE" is a UE subscribed to use a 3G RAT.

As shown, the 5G UE is roaming (e.g., is outside of a communication range of a base station of the 5G home network), and therefore, is unable to communicate with the 5G home network. Accordingly, as described herein, the UE may attempt to communicate (e.g., with a data network, with another UE, with the 5G home network, and/or the like) via the 3G visitor network and/or the 4G visitor network. As described herein, the roaming platform may be configured to determine whether the 5G UE is authorized to communicate (e.g., establishing and/or engaging in a communication session) via the 3G visitor network or the 4G visitor network.

As shown in FIG. 1, and by reference number 110, the UE requests to communicate via the 3G visitor network and/or 4G visitor network (either of which are referred to as "the visitor network" in this example). For example, the UE may detect that the UE is outside of the bounds of the 5G home network and may ping a base station of the visitor network to request to roam via the visitor network.

As further shown in FIG. 1, and by reference number 120, the visitor network may request the roaming platform to authenticate the UE. For example, based on receiving the request to roam from the UE, the visitor network may request the roaming platform to authenticate the UE and/or provide authorization for the visitor network to permit the UE to roam via the visitor network.

As further shown in FIG. 1, and by reference number 130, the roaming platform obtains authentication information from the home network. The roaming platform may be associated with one or more core networks of the 5G home network. For example, the roaming platform may include one or more components of a 3G core network associated with the 5G home network, one or more components of a 4G core network associated with the 5G home network, and/or a one or more components of a 5G core network associated with the 5G home network.

As described herein, the roaming platform may be configured as an interface between a 5G core network and another core network of the 5G home network. For example, the roaming platform may be configured to convert communication protocols of the core networks to permit the roaming platform to identify a serving component of the 5G core network (e.g., a UDM) for the UE, obtain authentication information from the UDM, and provide the authentication information using a communication protocol utilized by the requesting visitor network. More specifically, the roaming platform may convert an SS7 communication received in association with a roaming request involving the 3G visitor network to one or more HTTP communications to obtain the authentication information via the 5G home network and provide the authentication information via SS7 communication to the 3G visitor network. Additionally, or alternatively, the roaming platform may convert a diameter communication received in association with a roaming request to the 4G visitor network to one or more HTTP communications to obtain the authentication information via the 5G core network and provide the authentication information via diameter communication to the 4G visitor network.

As further shown in FIG. 1, and by reference number 140, the roaming platform indicates, to the visitor network, whether the UE is authorized to roam via the visitor network. For example, the roaming platform may provide the authentication information to the visitor network to permit the visitor network to authorize roaming or deny roaming for the UE.

In this way, a roaming platform associated with 5G home network may be configured to authorize a UE that is registered to use a 5G RAT with the home network to roam via a 3G visitor network and/or a 4G visitor network.

As indicated above, FIG. 1 is provided as an example. Other examples can differ from what is described with regard to FIG. 1.

Figure 2A:
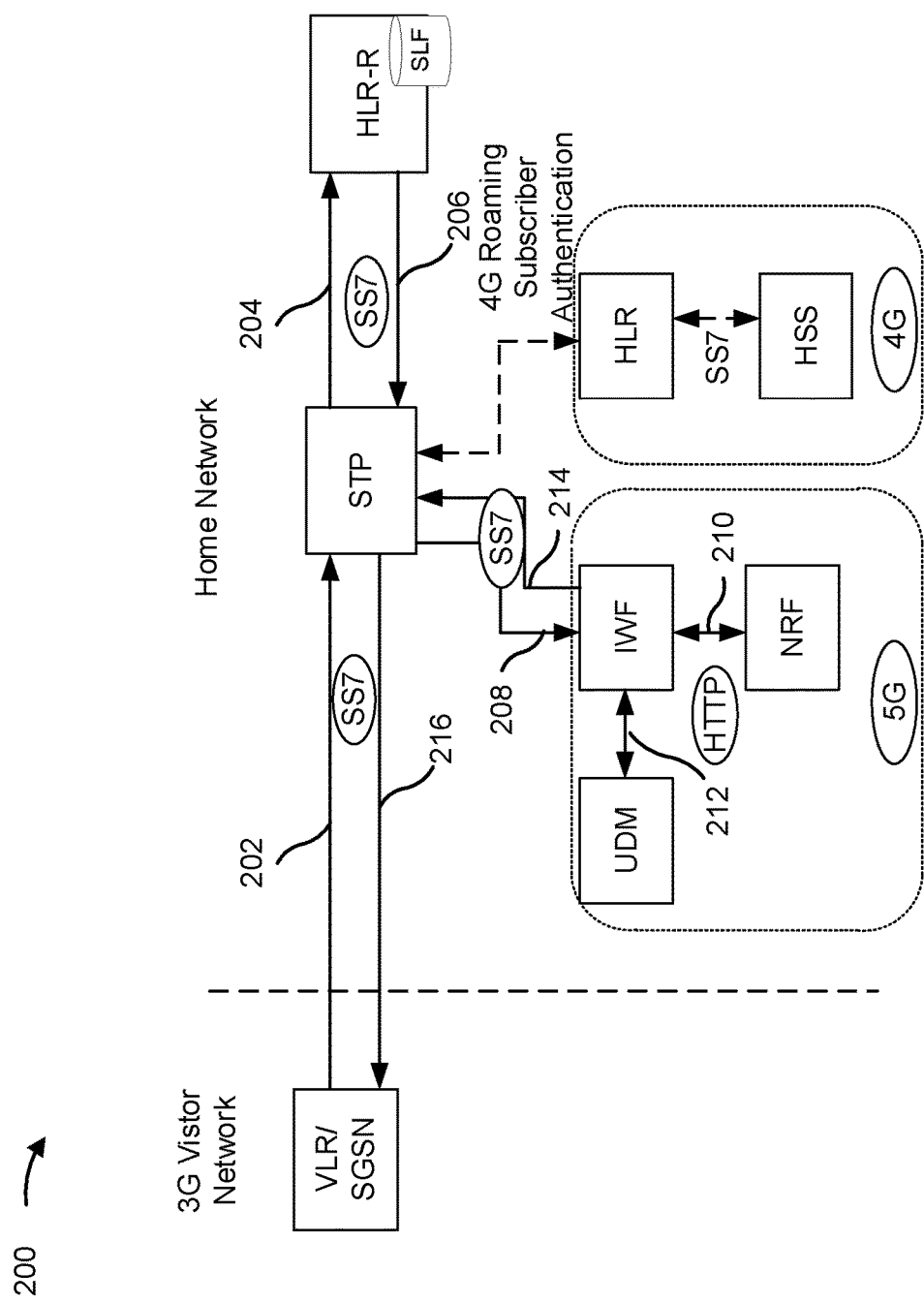
FIGS. 2A and 2B are diagrams of one or more example implementations described herein.
Figure 2B:
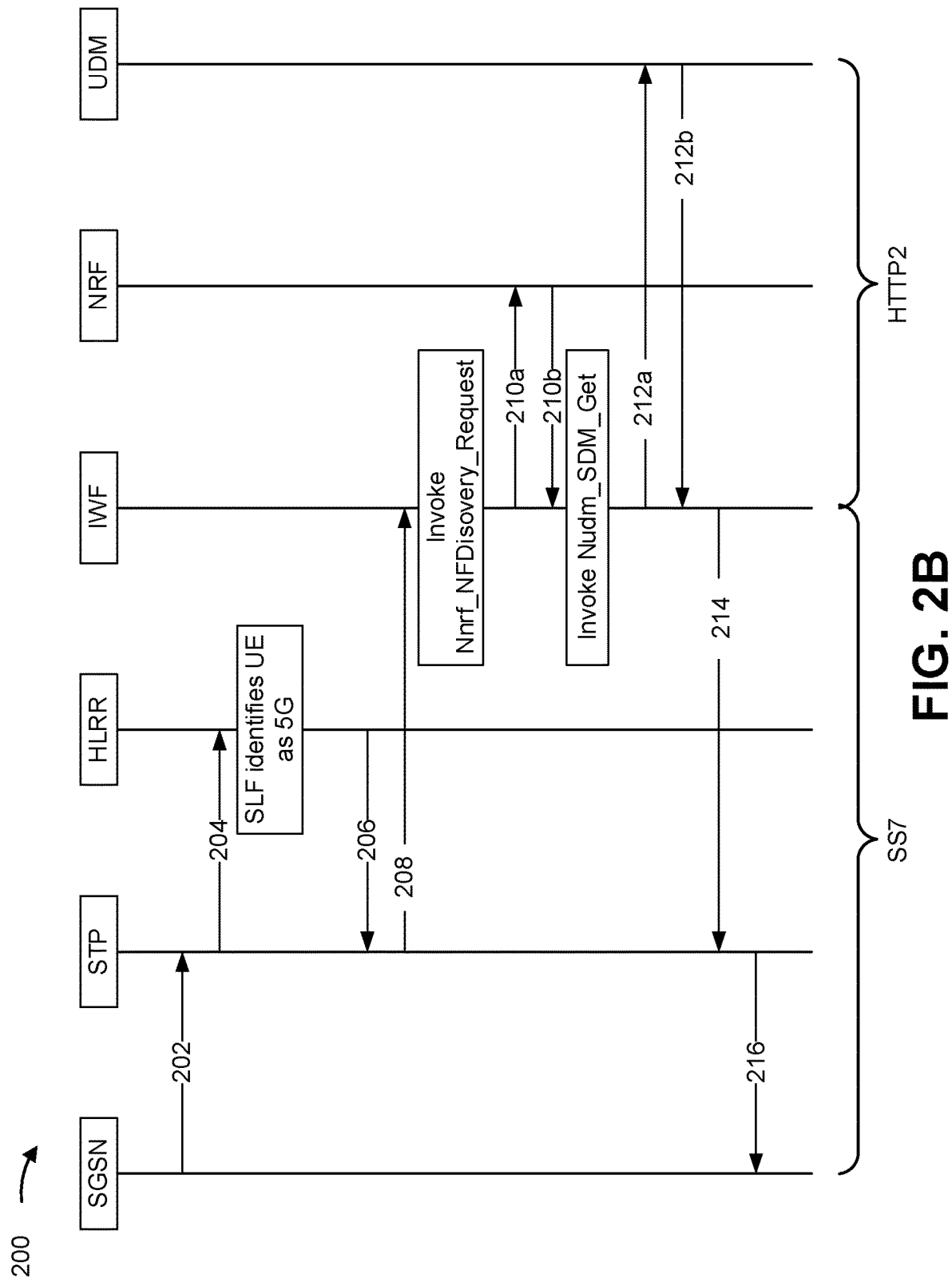

FIGS. 2A and 2B are diagrams of an example implementation 200 described herein. Example implementation 200 includes a 3G visitor network and an example home network. FIG. 2A includes an example architecture of the home network, which includes a signal transfer point (STP), a home location register router (HLR-R), a 4G core network (shown as "4G"), and a 5G core network (shown as "5G"). As shown in the example of FIG. 2A, the 4G core network includes a home location register (HLR) segment and a home subscriber server (HSS), and the 5G core network includes an IWF, a network function (NF) repository function (NRF), and a UDM. FIG. 2B includes an example call flow associated with authorizing a UE (e.g., a 3G UE, the 5G UE of FIG. 1, and/or the like) to roam via the 3G visitor network. The example call flow includes example communications between components of the 4G core network and components of the 5G core network to indicate whether the 3G visitor network is to permit the UE to communicate via the 3G visitor network. The reference numbers of FIG. 2A correspond to communications identified by corresponding reference numbers in the call flow of FIG. 2B.

As shown in FIG. 2A, and by reference number 202, a visitor location register (VLR) and/or serving general packet radio service (GPRS) support node (SGSN) sends an authorization information request to the home network. The authorization information request may identify a subscriber identity associated with the UE and/or an identifier of the UE (e.g., an International Mobile Serial Identifier (IMSI), a Mobile Station International Subscriber Directory Number (MSISDN), and/or the like) and indicate that the UE is to be authenticated by the home network to enable the 3G visitor network to permit or deny the UE to communicate via the 3G visitor network.

As shown, the VLR/SGSN may send the authorization information request to the STP of the home network. The STP may be a router that relays SS7 communications (e.g., messages that use SS7 communication protocol) associated with 3G networks (e.g., 3G roaming networks, such as the 3G visitor network, and/or a 4G core network of the home network). Accordingly, the STP, based on receiving an SS7 authentication information request, as shown by reference number 204, may forward the authentication information request to the HLR-R of the 4G core network.

As shown, the HLR-R may include a subscriber location function (SLF). The SLF includes a mapping of subscriber identities (and/or identifiers of UEs) to HLR segments for communication sessions involving 4G UEs. According to some implementations, the SLF may include a mapping of subscriber identities to RATs of UEs subscribed to the home network. For example, the SLF may include a mapping that indicates whether a subscriber identity (e.g., of an authentication information request) is associated with a 5G UE a 4G UE, and/or the like. In connection with reference number 206, the HLR-R may indicate to the STP whether the UE is a 5G UE or a 4G UE. Accordingly, when the authentication information request is associated with a 4G UE, the HLR-R may cause the STP to route an authentication request to an HLR segment (which includes an HLR and a home subscriber server (HSS)) of the 4G core network that is identified in the SLF. For example, the HLR-R may indicate a global title (GT) of the HLR segment associated with the 4G UE. In such a case, based on receiving the GT of the HLR segment, the STP may send an authentication request (e.g., via SS7 communication protocol) to the 4G core network to permit the 4G core network to indicate, using any suitable techniques, whether the 4G UE can roam via the 3G visitor network. When the authentication information request identifies a 5G UE, rather than receiving a GT of an HLR segment from the HLR-R, the STP may receive, via an SS7 communication, an identifier of the IWF of the 5G core network. For example, the HLR-R may be configured to replace a GT in the authentication information request with the identifier of the IWF, and return the authentication information request to the STP to cause the STP to send an authentication request to the IWF.

As shown by reference number 208, when the authentication information request is associated with a 5G UE and/or when the STP receives an identifier of the IWF from the HLR-R, the STP may send an authentication request to the IWF of the 5G core network via an SS7 communication. The IWF may be configured to receive the authentication request as an SS7 communication, analyze the authentication request, and identify a subscriber identity (e.g., the identifier of the UE) of the authentication request. Further, the IWF may invoke an NRF discovery request, as shown by reference number 210, and use HTTP communications (e.g., a message that uses HTTP1.x communication protocol, a message that uses HTTP2 communication protocol, and/or the like) of a service-based interface (SBI) of the 5G core network to access the NRF and/or obtain an identification of a UDM that is associated with the UE. For example, as shown in FIG. 2B, the IWF may send a request message 210a to the NRF that includes the subscriber identity of the authentication request. Correspondingly, the NRF may send, to the IWF, a response message 210b (e.g., a 200 OK response) that includes UDM information that identifies the serving UDM associated with the UE (e.g., an instance of the UDM of the 5G core network to which the UE is registered).

Based on receiving the UDM information, the IWF may invoke a UDM operation, as shown by reference number 212, and obtain authentication information from the UDM. The IWF, via the SBI, may send an HTTP communication to the UDM to request authentication information associated with the UE. For example, as shown in FIG. 2B, the IWF may send a request message 212a to the UDM that includes the subscriber identity of the authentication request. Correspondingly, the UDM may send, to the IWF, a response message 212b (e.g., a 200 OK response) that includes the authentication information that indicates whether the UE is permitted to communicate via the 3G visitor network. For example, the authentication information may indicate that the UE is authorized to roam via the 3G visitor network or that the UE is not authorized to roam via the 3G visitor network (e.g., according to a service level agreement (SLA) associated with the UE, an agreement between a service provider of the 3G visitor network and the home network, and/or the like).

As shown in example implementation 200, and by reference number 214, the IWF may generate an SS7 authentication response according to the response from the UDM, and/or provide the SS7 authentication response to the STP. The STP, as shown by reference number 216, may correspondingly respond to the VLR/SGSN according to the SS7 authentication response to permit the 3G visitor network to enable or deny a communication session involving a 5G UE and the 3G visitor network (e.g., a communication session that permits the 5G UE to use the 3G visitor network to access another UE and/or a data network).

In some implementations, the IWF may be configured to convert SS7 communications to HTTP communications and/or HTTP communications to SS7 communications. For example, the SBI of the 5G core network may be configured to use an HTTP communication protocol. Accordingly, when an SS7 communication is received, the IWF may convert the SS7 communication to an HTTP communication that is to be distributed through the 5G core network, as described herein. Furthermore, when an SS7 communication is to be transmitted, the IWF may convert an HTTP communication of the 5G core network to an SS7 communication. The IWF may perform such a conversion using a mapping of SS7 messages and corresponding HTTP messages. Such messages may include authentication messages, corresponding error messages, and/or the like. For example, if the UDM responds to the IWF with an error message (e.g., indicating that the UE is not authorized to communicate via the 3G visitor network, that the UDM cannot be reached, and/or the like), a corresponding SS7 error message may be provided to the STP to permit the STP to correspondingly respond to the VLR/SGSN of the 3G visitor network. Additionally, or alternatively, if the NRF responds to the IWF with an error message (e.g., indicating that the UE is not associated with the home network, that the NRF cannot be reached, and/or the like), a corresponding SS7 error message may be provided to the STP to permit the STP to correspondingly respond to the VLR/SGSN.

In this way, the IWF permits a 5G UE that is subscribed to the home network to be authorized and/or authenticated for communication via a 3G visitor network by serving as an interface between the 5G core network components and the STP and/or 4G core network of the home network.

As indicated above, FIGS. 2A and 2B are provided as an example. Other examples can differ from what is described with regard to FIGS. 2A and 2B.

Figure 3A:
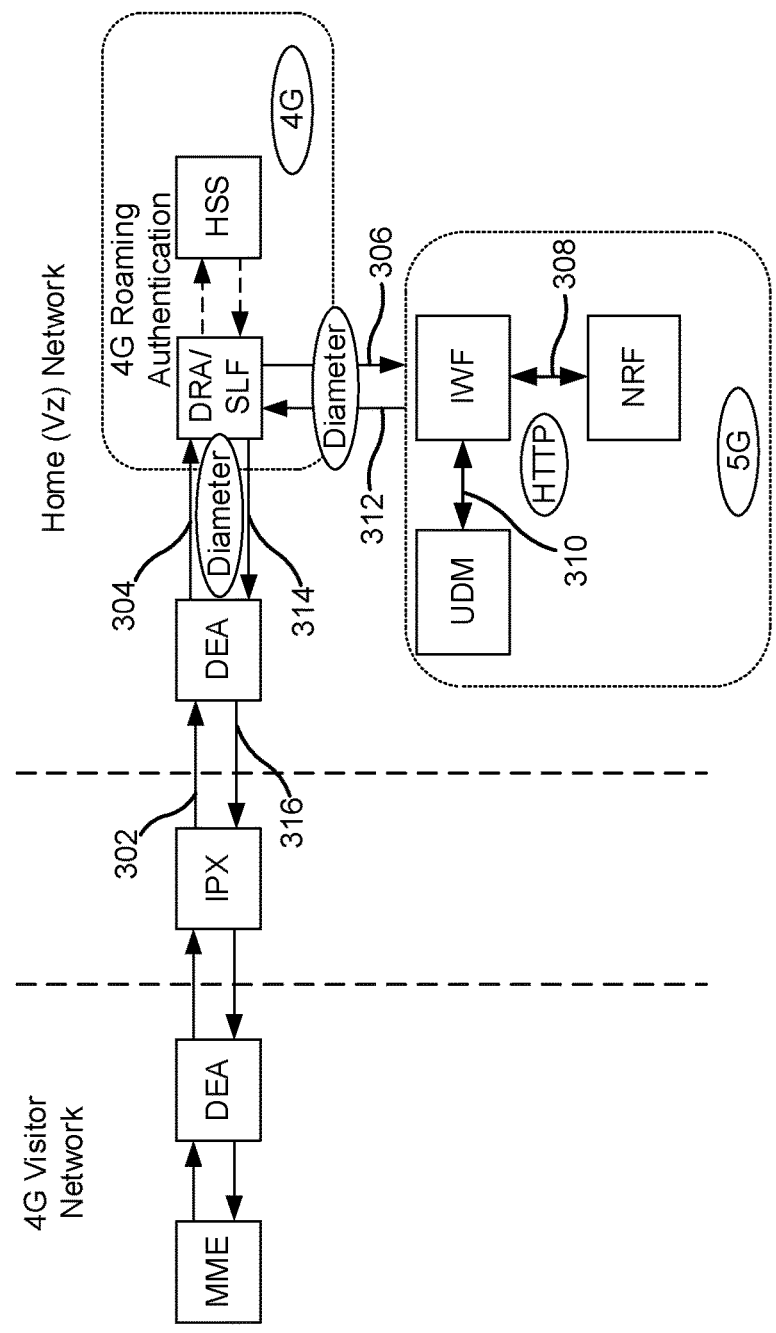
FIGS. 3A and 3B are diagrams of one or more example implementations described herein.
Figure 3B:
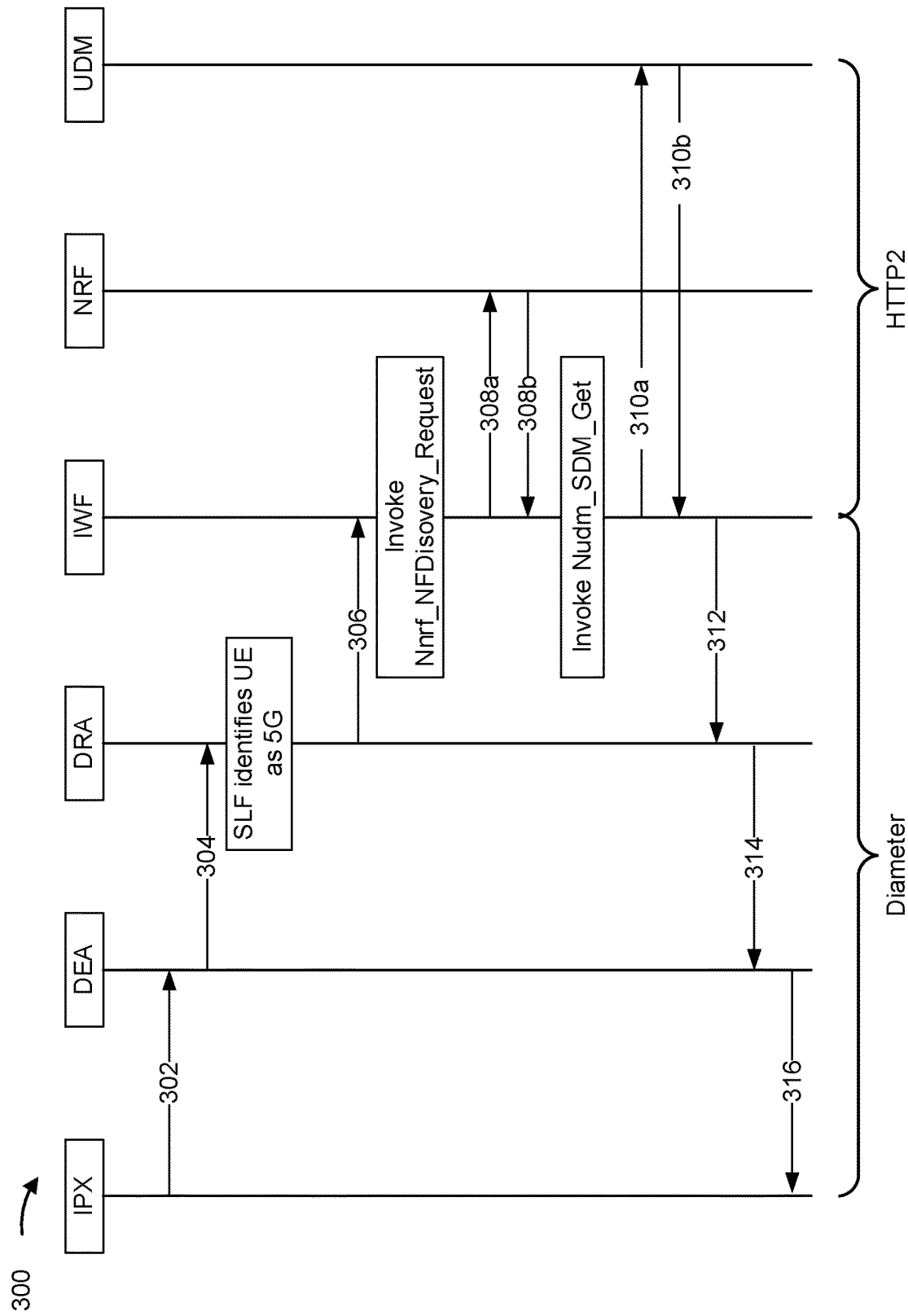

FIGS. 3A and 3B are diagrams of an example implementation 300 described herein. Example implementation 300 includes a 4G visitor network, an internet protocol (IP) exchange (IPX), and an example home network. FIG. 3A includes an example architecture of the home network, which includes a diameter edge agent (DEA), 4G core network (shown as "4G"), and a 5G core network (shown as "5G"). As shown in the example of FIG. 2A, the 4G core network includes a diameter routing agent (DRA)/SLF and an HSS, and the 5G core network includes an IWF, a NRF, and a UDM (e.g., similar to the 5G core network of example implementation 200). FIG. 3B includes an example call flow associated with authorizing a UE (e.g., a 4G UE, the 5G UE of FIG. 1, and/or the like) to roam via the 4G visitor network. The example call flow includes example communications between components of the 4G core network and components of the 5G core network to indicate whether the 4G visitor network is to permit the UE to communicate via the 4G visitor network. The reference numbers of FIG. 3A correspond to the communications identified by corresponding reference numbers in the call flow of FIG. 3B.

As shown in FIG. 3A, and by reference number 302, the IPX sends an authorization information request to the home network. The IPX may have received the authentication information request from a DEA and/or a mobility management entity (MME) of the visitor network. Similar to the authentication information request of example implementation 200, the authentication information request may include information that includes a subscriber identity associated with the UE (and/or an identifier of the UE) and indicate that the UE is to be authenticated by the home network to permit the 4G visitor network to permit or deny the UE to communicate via the 4G visitor network.

As shown, the IPX may send the authentication information request to the DEA of the home network. The DEA may serve as a router that relays diameter communications (e.g., messages that use diameter communication protocol) associated with 4G networks (e.g., 4G roaming networks, such as the 4G visitor network, and/or a 4G core network of the home network). Accordingly, the DEA, based on receiving a diameter authentication information request, as shown by reference number 304, may forward the authentication information request to the DRA/SLF.

The DRA/SLF may include a mapping of subscriber identities to serving HSSs for communication sessions involving 4G UEs. The SLF of example implementation 300 may be similar to the SLF of example implementation 200. Accordingly, in some implementations, the SLF may include a mapping that indicates whether a subscriber identity (e.g., of an authentication information request) is associated with a 5G UE, a 4G UE, and/or the like. Therefore, the DRA/SLF may perform a SLF database lookup to identify whether the UE is a 4G UE or a 5G UE. When the DRA/SLF determines that the UE is a 4G UE, the DRA/SLF may send an authentication request to the HSS to permit the HSS, using any suitable techniques, to indicate whether the 4G UE can roam via the 4G visitor network.

As shown by reference number 306, when the DRA/SLF determines that the UE of an authentication information request is a 5G UE, the DRA/SLF may send the authentication request to the IWF of the 5G core network. For example, the DRA/SLF may send the authentication request to the IWF via a diameter communication. The IWF may be configured to receive the authentication request as a diameter communication, analyze the authentication request, and identify (and/or extract) a subscriber identity (e.g., the identifier of the UE) of the authentication request. Similar to example implementation 200, as shown by reference number 308, the IWF may send an NRF discovery request and use HTTP communications of an SBI of the 5G core network to access the NRF and/or obtain an identification of a UDM that is associated with the UE. For example, as shown in FIG. 3B, the IWF may send a request message 308a to the NRF that includes the subscriber identity of the authentication request. Correspondingly, the NRF may send, to the IWF, a response message 308b (e.g., a 200 OK response) that includes UDM information that identifies the serving UDM associated with the UE.

Similar to example implementation 200, based on receiving the UDM information, the IWF may invoke a UDM operation, as shown by reference number 310, and obtain authentication information from the UDM. The IWF, via the SBI, may send an HTTP communication to the UDM to request authentication information associated with the UE. For example, as shown in FIG. 3B, the IWF may send a request message 310a to the UDM that includes the subscriber identity of the authentication request. Correspondingly, the UDM may send, to the IWF, a response message 310b (e.g., a 200 OK response) that includes the authentication information that indicates whether the UE is permitted to communicate via the 4G visitor network. For example, the authentication information may indicate that the UE is authorized to roam via the 4G visitor network or that the UE is not authorized to roam via the 4G visitor network (e.g., according to an SLA associated with the UE, an agreement between a service provider of the 4G visitor network and the home network, and/or the like).

As shown in example implementation 300, and by reference number 312, the IWF of example implementation 300 may generate a diameter authentication response according to the response from the UDM, and/or provide the diameter authentication response to the DRA/SLF. The DRA/SLF, as shown by reference number 314, may correspondingly respond to the DEA, which may then forward the authentication response to the IPX, as shown by reference number 316. The IPX may correspondingly respond to the DEA and/or MME of the 4G visitor network according to the diameter authentication response to permit the 4G visitor network to enable or deny a communication session involving a 5G UE and the 4G visitor network (e.g., a communication session that permits the 5G UE to use the 4G visitor network to access another UE and/or a data network).

In some implementations, the IWF may be configured to convert diameter communications to HTTP communications and/or HTTP communications to diameter communications. Similar to example implementation 200, the SBI of the 5G core network of example implementation 300 may be configured to use an HTTP communication protocol. Accordingly, when a diameter communication is received, the IWF may convert the diameter communication to an HTTP communication that is to be distributed through the 5G core network, as described herein. Furthermore, when a diameter communication is to be transmitted, the IWF may convert an HTTP communication of the 5G core network to a diameter communication. The IWF may perform such a conversion using a mapping of diameter messages and corresponding HTTP messages. Such messages may include authentication messages, corresponding error messages, and/or the like. For example, if the UDM responds to the IWF with an error message (e.g., indicating that the UE is not authorized to communicate via the 3G visitor network, that the UDM cannot be reached, and/or the like), a corresponding diameter error message may be provided to the DRA/SLF to permit the DRA/SLF to cause the DEA correspondingly respond to the IPX (and/or 4G visitor network). Additionally, or alternatively, if the NRF responds to the IWF with an error message (e.g., indicating that the UE is not associated with the home network, that the NRF cannot be reached, and/or the like), a corresponding diameter error message may be provided to the DRA/SLF to permit the DRA/SLF to cause the DEA to correspondingly respond to the IPX (and/or 4G visitor network).

In this way, the IWF permits a 5G UE that is subscribed to the home network to be authorized and/or authenticated for communication via a 4G visitor network by serving as an interface between the 5G core network components and the 4G core network of the home network.

As indicated above, FIGS. 3A and 3B are provided as an example. Other examples can differ from what is described with regard to FIGS. 3A and 3B.

Figure 4:
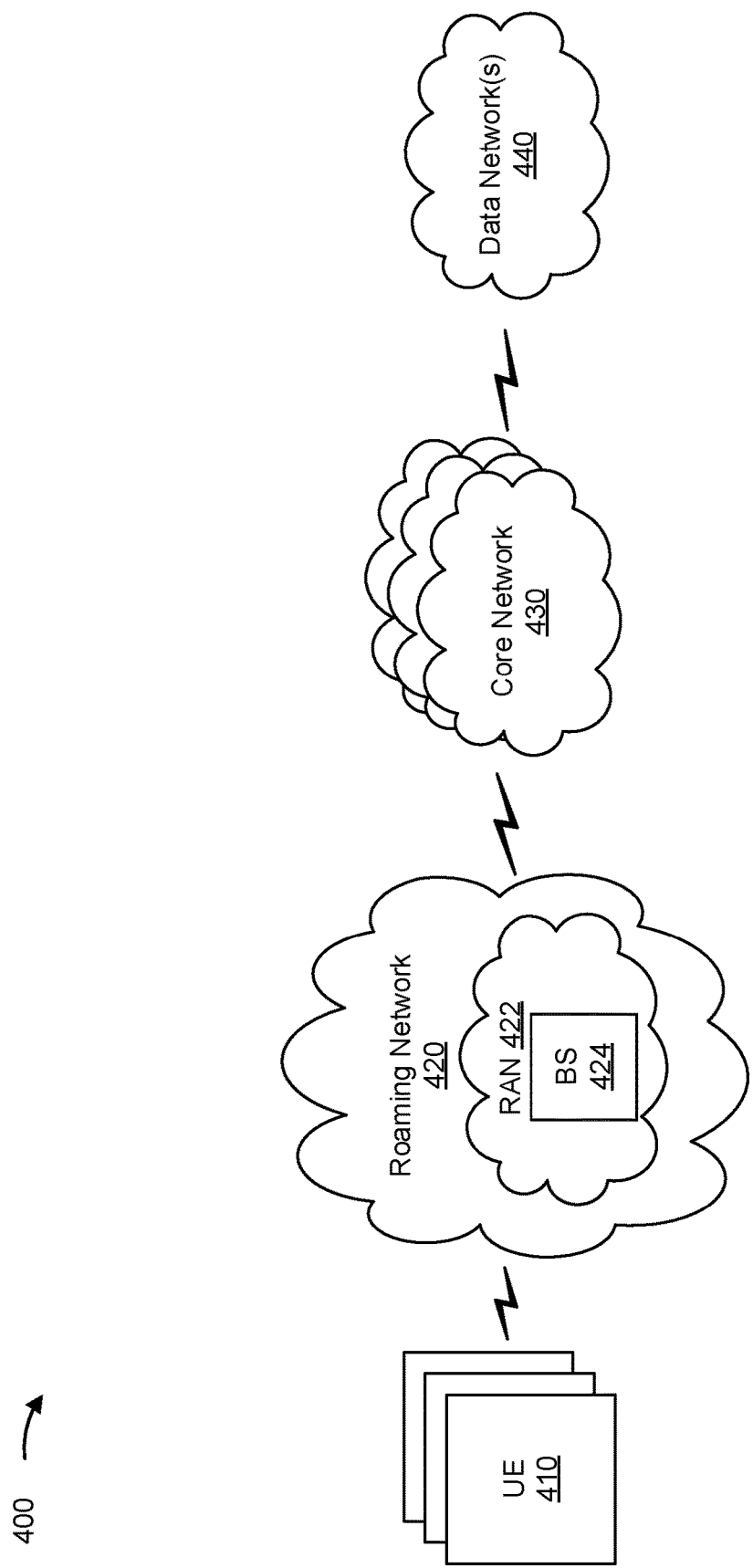
FIG. 4 is a diagram of an example environment in which systems and/or methods described herein may be implemented.

FIG. 4 is a diagram of an example environment 400 in which systems and/or methods, described herein, may be implemented. As shown in FIG. 4, environment 400 may include one or more UEs (referred to herein individually as "UE 410", and collectively as "UEs 410"), a roaming network 420 with a radio access network (RAN) 422 that includes a base station ("BS") 424, one or more core networks 430 (referred to herein individually as "core network 430", and collectively as "core networks 430"), and a data network 440. As described herein, core networks 430 may include and/or be associated with a roaming platform (e.g., the roaming platform of FIG. 1) that enables the UE to roam via roaming network 420 to permit the UE to engage in a communication session with data network 440. Devices of environment 400 may interconnect via wired connections, wireless connections, or a combination of wired and wireless connections.

UE 410 may include one or more devices capable of communicating with base station 424 and/or a network (e.g., data network 440). For example, UE 410 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 410 may be capable of communicating using uplink (e.g., UE to base station) communications, downlink (e.g., base station to UE) communications, and/or sidelink (e.g., UE-to-UE) communications. In some implementations, UE 410 may include a machine-type communication (MTC) UE, such as an evolved or enhanced MTC (eMTC) UE. In some implementations, UE 410 may include an Internet of Things (IoT) UE, such as a narrowband IoT (NB-IoT) UE and/or the like.

Roaming network 420 corresponds to a network to which UE 410 (or an owner of UE) is not subscribed. For example, UE 410 may not be configured to directly operate under a service agreement with a service provider of roaming network 420. Additionally, or alternatively, a user (e.g., an owner) of UE 410 may not have a service agreement with a service provider of roaming network 420. In other words, roaming network 420 may be considered a "visitor network," as used herein. Roaming network 420 may be a 3G network and/or a 4G LTE network. Accordingly, roaming network 420 may include one or more components and/or functions of a 3G network or 4G network, as described herein.

RAN 422 includes base station 424 and may be operatively connected, via a wired and/or wireless connection, to the core network 430 (e.g., via a user plane function (UPF)). RAN 422 may facilitate communication sessions between UEs and data network 440 by communicating application-specific data between RAN 422 and core network 430.

Base station 424 includes one or more devices capable of communicating with UE 410 using a cellular radio access technology (RAT). For example, base station 424 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 424 may transfer traffic between UE 410 (e.g., using a cellular RAT), other base stations (e.g., using a wireless interface or a backhaul interface, such as a wired backhaul interface), and/or data network 440. Base station 424 may provide one or more cells that cover geographic areas. Some base stations 424 may be mobile base stations. Some base stations 424 may be capable of communicating using multiple RATs.

In some implementations, base station 424 may perform scheduling and/or resource management for UEs 410 covered by base station 424 (e.g., UEs 410 covered by a cell provided by base station 424). In some implementations, base station 424 may be controlled or coordinated by a network controller, which may perform load balancing, network-level configuration, and/or the like. The network controller may communicate with base station 424 via a wireless or wireline backhaul. In some implementations, base station 424 may include a network controller, a self-organizing network (SON) module or component, or a similar module or component. In other words, a base station 424 may perform network control, scheduling, and/or network management functions (e.g., for other base stations and/or for uplink, downlink, and/or sidelink communications of UEs 410 covered by base station 424). In some implementations, base station 424 may include a central unit and multiple distributed units. The central unit may coordinate access control and communication with regard to the multiple distributed units. The multiple distributed units may provide UEs 410 and/or other base station with access to data network 440.

Core network 430 may include various types of core network architectures, such as a 4G core network (e.g., an LTE core network), 5G core network (e.g., a NG Core network, such as core network 500 of FIG. 5), an LTE evolved packet core (EPC), and/or the like. In some implementations, core network 430 may be implemented on physical devices, such as a router, an IPX device, a gateway, a mobility management entity, and/or the like. In some implementations, the hardware and/or software implementing core network 430 may be virtualized (e.g., through the use of network function virtualization and/or software-defined networking), thereby allowing for the use of composable infrastructure when implementing core network 430. In this way, networking, storage, and compute resources may be allocated to implement the functions of core network 430 in a flexible manner as opposed to relying on dedicated hardware and software to implement these functions.

Core network 430 may include and/or be communicatively coupled with a roaming platform (e.g., the roaming platform of FIG. 1). For example, core network 430 may include an STP, an HLR-R, and/or an SLF of a 4G core network; a DEA, a DRA, an SLF, and/or an HSS of a 4G core network, and/or an IWF, a UDM, and/or an NRF of a 5G core network (e.g., as shown in FIGS. 2A and/or 3A).

Data network 440 includes one or more wired and/or wireless data networks. Data network 440 may include various types of data networks, such as the Internet, a third-party services network, an operator services network, a private network, a wide area network, and/or the like. For example, data network 440 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
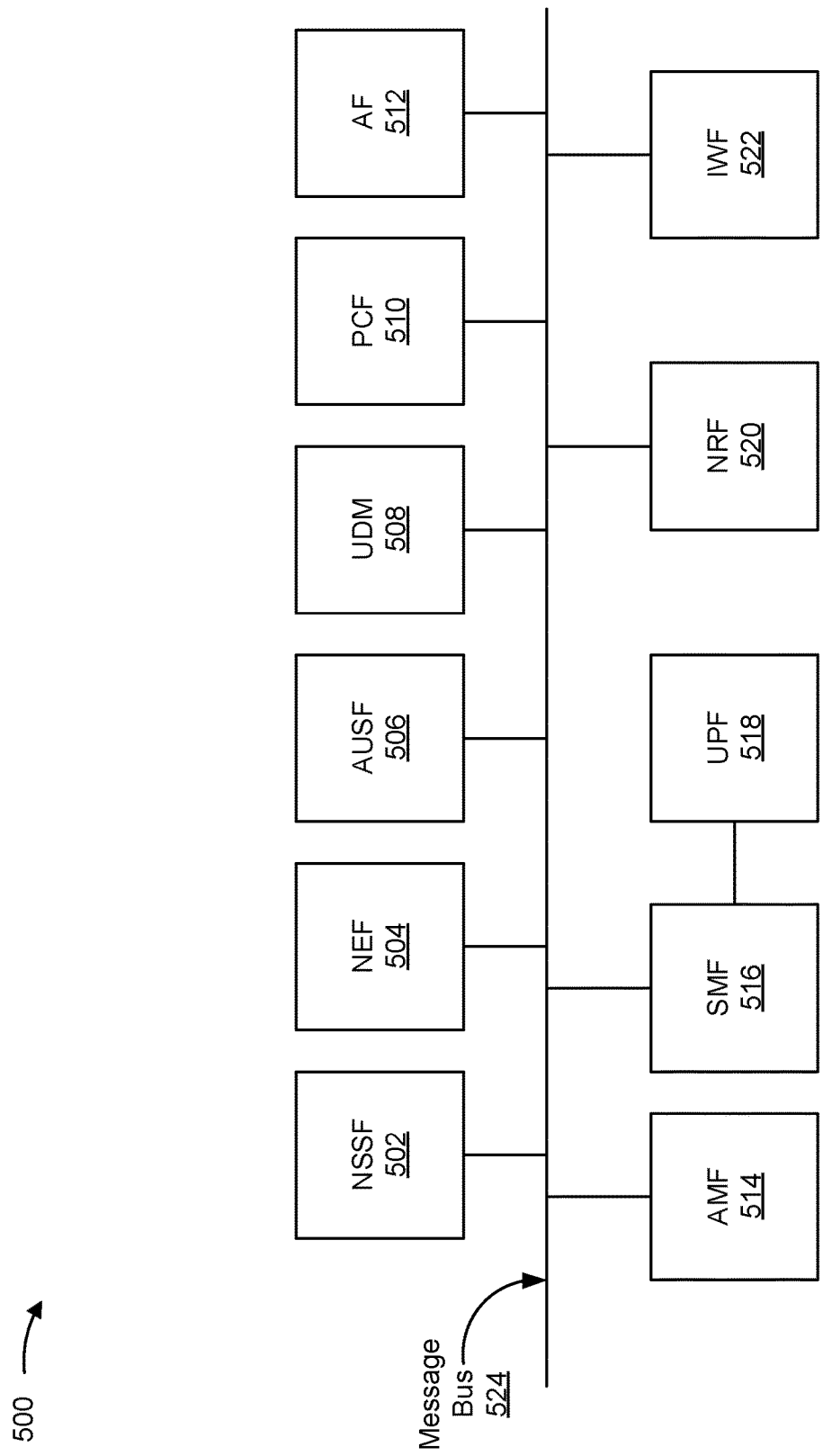
FIG. 5 is a diagram of an example functional architecture of an example core network described herein.

FIG. 5 is a diagram of an example functional architecture of a core network 500 in which systems and/or methods, described herein, may be implemented. For example, FIG. 5 may show an example functional architecture of a 5G NG core network included in a 5G wireless telecommunications system. In some implementations, the example functional architecture may be implemented by a core network (e.g., core network 430 of FIG. 4) and/or one or more of devices (e.g., a device described in connection with FIG. 6). While the example functional architecture of core network 500 shown in FIG. 5 may be an example of a service-based architecture, in some implementations, core network 500 may be implemented as a reference-point architecture.

As shown in FIG. 5, core network 500 may include one or more functional elements, which may be referred to herein as NFs. The functional elements may include, for example, a Network Slice Selection Function (NSSF) 502, a Network Exposure Function (NEF) 504, an Authentication Server Function (AUSF) 506, a UDM component 508, a Policy Control Function (PCF) 510, an Application Function (AF) 512, an Access and Mobility Management Function (AMF) 514, a Session Management Function (SMF) 516, a User Plane Function (UPF) 518, a NRF 520, IWF 522, and a message bus 524. These functional elements may be communicatively connected via a message bus 524, which may be comprised of one or more physical communication channels and/or one or more virtual communication channels. Each of the functional elements shown in FIG. 5 is implemented on one or more devices associated with a wireless telecommunications system. In some implementations, one or more of the functional elements may be implemented on physical devices, such as an access point, a RAN, a gateway, a server, and/or the like. In some implementations, one or more of the functional elements may be implemented on one or more computing devices of a cloud computing environment associated with the wireless telecommunications system. In some implementations, the core network 500 may be operatively connected to a RAN 422, a data network 440, and/or the like, via wired and/or wireless connections with UPF 518.

NSSF 502 may select network slice instances for UEs, where NSSF 502 may determine a set of network slice policies to be applied at the RAN 422. By providing network slicing, NSSF 502 allows an operator to deploy multiple substantially independent end-to-end networks potentially with the same infrastructure. In some implementations, each slice may be customized for different services. NEF 504 may support the exposure of capabilities and/or events in the wireless telecommunications system to help other entities in the wireless telecommunications system discover network services and/or utilize network resources efficiently.

AUSF 506 may act as an authentication server and support the process of authenticating UEs in the wireless telecommunications system. UDM 508 may store subscriber data and profiles in the wireless telecommunications system. UDM 508 may be used for fixed access, mobile access, and/or the like, in core network 500. PCF 510 may provide a policy framework that incorporates network slicing, roaming, packet processing, mobility management, and/or the like.

AF 512 may determine whether UEs provide preferences for a set of network slice policies and support application influence on traffic routing, access to NEF 504, policy control, and/or the like. AMF 514 may provide registration and mobility management of UEs. SMF 516 may support the establishment, modification, and release of communications sessions in the wireless telecommunications system. For example, SMF 516 may configure traffic steering policies at UPF 518, enforce UE IP address allocation and policies, and/or the like. AMF 514 and SMF 516 may act as a termination point for Non Access Stratum (NAS) signaling, mobility management, and/or the like. SMF 516 may act as a termination point for session management related to NAS. RAN 422 may send information (e.g. the information that identifies the UE) to AMF 514 and/or SMF 516 via PCF 510.

UPF 518 may serve as an anchor point for intra/inter RAT mobility. UPF 518 may apply rules to packets, such as rules pertaining to packet routing, traffic reporting, handling user plane QoS, and/or the like. UPF 518 may determine an attribute of application-specific data that is communicated in a communications session. UPF 518 may receive information (e.g., the information that identifies the communications attribute of the application) from RAN 422 via SMF 516 or an application programming interface (API). Message bus 524 represents a communication structure for communication among the functional elements (e.g., an SBI). In other words, message bus 524 may permit communication between two or more functional elements. Message bus 524 may be a message bus, HTTP/2 proxy server, and/or the like. NRF 520 may serve as a service discovery function that maintains an NF profile and/or available NF instances. For example, NRF 520 may include a service mapping of the NFs for UEs subscribed to utilize and/or communication in association with core network 500.

IWF 522 may serve as a routing function that is configured to interface with other core networks of a home network associated with core network 500. For example, IWF 522 may communicate with one or more routing functions associated with a 3G core network associated with core network 500 and/or one or more routing functions associated with a 4G core network associated with core network 500. IWF 522 may be configured to identify UDM 508 via NRF 520 and obtain authentication information associated with a UE managed by UDM 508. Further, IWF may be configured to convert the authentication information to be transmitted and/or provided via a different communication protocol from which the authentication information is received from UDM 508, as described herein.

RAN 422 may include and/or be comprised of one or more base stations operatively connected, via a wired and/or wireless connection, to the core network 500 through UPF 518. RAN 422 may facilitate communications sessions between UEs (e.g., UE 410) and a data network (e.g., data network 440) by communicating application-specific data between RAN 422 and core network 500. As described herein, the data network may include various types of data networks, such as the Internet, a third party services network, an operator services network, a private network, a wide area network, and/or the like.

The number and arrangement of functional elements shown in FIG. 5 are provided as an example. In practice, there may be additional functional elements, fewer functional elements, different functional elements, or differently arranged functional elements than those shown in FIG. 5. Furthermore, two or more functional elements shown in FIG. 5 may be implemented within a single device, or a single functional element shown in FIG. 5 may be implemented as multiple, distributed devices. Additionally, or alternatively, a set of functional elements (e.g., one or more functional elements) of core network 500 may perform one or more functions described as being performed by another set of functional elements of core network 500.

FIG. 6 is a diagram of example components of a device 600. Device 600 may correspond UE 410, base station 424, NSSF 502, NEF 504, AUSF 506, UDM 508, PCF 510, AF 512, AMF 514, SMF 516, UPF 518, NRF 520, and/or IWF 522. In some implementations, UE 410, the base station of RAN 422, NSSF 502, NEF 504, AUSF 506, UDM 508, PCF 510, AF 512, AMF 514, SMF 516, UPF 518, NRF 520, and/or IWF 522 may include one or more devices 600 and/or one or more components of device 600. As shown in FIG. 3, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a wireless local area network interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flow chart of an example process 700 for authorizing roaming for new radio subscribers via an alternative RAT. In some implementations, one or more process blocks of FIG. 7 may be performed by an IWF (e.g., IWF 522). In some implementations, one or more process blocks of FIG. 7 may be performed by another device or a group of devices separate from or including the IWF, such as an NSSF (e.g., NSSF 502), an NEF (e.g., NEF 504), an AUSF (e.g., AUSF 506), a UDM (e.g., UDM 508), a PCF (e.g., PCF 510), an AF (e.g., AF 512), an AMF (e.g., AMF 514), an SMF (e.g., SMF 516), a UPF (e.g., UPF 518), an NRF (e.g., NRF 520), and/or the like.

As shown in FIG. 7, process 700 may include receiving, via a first communication protocol, an authentication request associated with a UE (block 710). For example, the IWF (e.g., using processor 620, memory 630, storage component 640, input component 650, output component 660, communication interface 670 and/or the like) may receive, via a first communication protocol, an authentication request associated with a user equipment (UE), as described above. The UE may be subscribed to communicate via a first radio access technology of a home network. The authentication request may be associated with enabling the UE to communicate via a visitor network that utilizes a second radio access technology.

The authentication request may be associated with authorizing the UE to engage in a communication session via the visitor network. The first radio access technology may be a New Radio technology and the second radio access technology may be at least one of: a Global System for Mobile communication technology or a Long-Term Evolution technology. Additionally, or alternatively, the first communication protocol may be at least one of: a Signaling System Number 7 (SS7) protocol or a diameter protocol.

The authentication request may be received from a roaming component of the home network, and the roaming component may be configured to determine that the UE is subscribed to communicate via the first radio access technology. For example, the roaming component may be configured to determine that the UE is subscribed to communicate via the first radio access technology based on a subscription locator function of the home network. The subscriber location function may be associated with communicating via the home network using the second radio access technology.

The authentication request may be received based on the subscriber location function being accessed in association with the second radio access technology. For example, the home network may include a primary network that utilizes the first radio access technology and a secondary network that utilizes the second radio access technology, and the subscriber location function may be associated with the secondary network of the home network.

As further shown in FIG. 7, process 700 may include identifying an identifier associated with the UE in the authentication request (block 720). For example, the IWF (e.g., using processor 620, memory 630, storage component 640, input component 650, output component 660, communication interface 670 and/or the like) may identify an identifier associated with the UE in the authentication request, as described above.

As further shown in FIG. 7, process 700 may include determining, based on the identifier, a serving component of the home network that is configured to serve the UE (block 730). For example, the IWF (e.g., using processor 620, memory 630, storage component 640, input component 650, output component 660, communication interface 670 and/or the like) may determine, based on the identifier, a serving component of the home network that is configured to serve the UE, as described above.

Process 700 may include determining the serving component of the home network, that is configured to serve the UE, based on the identifier and a service mapping of the home network. For example, the service mapping may be maintained by a network repository function of the home network. The serving component may correspond to a unified data management component of the home network.

As further shown in FIG. 7, process 700 may include obtaining, from the serving component, authentication information associated with the UE (block 740). For example, the IWF (e.g., using processor 620, memory 630, storage component 640, input component 650, output component 660, communication interface 670 and/or the like) may obtain, from the serving component, authentication information associated with the UE, as described above. The authentication information may be obtained via a second communication protocol.

Process 700 may include requesting the serving component to provide authentication information that indicates whether the UE is authorized to engage in the communication session, and receiving, from the serving component and via the second communication protocol, the authentication information. The second communication protocol may be a hypertext transfer protocol.

Process 700 may include communicating, via the second communication protocol, with the serving component to determine whether the UE is authorized to communicate via the visitor network. The UE may be determined to be authorized to communicate via the visitor network based on a message from the serving component indicating that the UE is subscribed for roaming via the visitor network.

Process 700 may include detecting, when communicating with the serving component, an error associated with the second communication protocol, and determining an error response for the first communication protocol that corresponds to the error associated with the second communication protocol. The authentication response may include the error response.

As further shown in FIG. 7, process 700 may include providing, based on the authentication information, an authentication response to the authentication request (block 750). For example, the IWF (e.g., using processor 620, memory 630, storage component 640, input component 650, output component 660, communication interface 670 and/or the like) may provide, based on the authentication information, an authentication response to the authentication request, as described above.

Process 700 may include generating the authentication response based on the authentication information and the first communication protocol, and the authentication response may be provided using the first communication protocol. For example, process 700 may include generating, based on whether the UE is determined to be authorized to communicate via the visitor network, the authentication response, and providing, via the first communication protocol, the authentication response to enable the visitor network to authorize or deny a communication session associated with the UE.

The authentication response may permit the visitor network to: enable the UE to engage in a communication session via the visitor network when the authentication information indicates that the UE is associated with a roaming subscription associated with the visitor network, or prevent the UE from engaging in the communication session via the visitor network when the authentication information indicates that the UE is not associated with a roaming subscription associated with the visitor network.

Process 700 may include transmitting the authentication response to the authentication request, in accordance with the authentication information, to permit the visitor network to manage the communication session. Process 700 may include extracting the authentication information from an authentication message received from the serving component via the second communication protocol, and generating the authentication response based on the authentication information and the first communication protocol.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and via a first communication protocol, an authentication request associated with a user equipment (UE),
      wherein the UE is subscribed to communicate via a first radio access technology of a home network, and
      wherein the authentication request is associated with enabling the UE to communicate via a visitor network that utilizes a second radio access technology;
   identifying, by the device, an identifier, associated with the UE, in the authentication request;
   determining, by the device and based on the identifier, that the UE is subscribed to communicate via the first radio access technology;
   determining, by the device and based on determining that the UE is subscribed to communicate via the first radio access technology, a particular serving component, from a plurality of serving components associated with the home network, that is configured to serve the UE;
   communicating, by the device and via a second communication protocol, with the particular serving component to determine whether the UE is authorized to communicate via the visitor network,
   generating, by the device and based on whether the UE is determined to be authorized to communicate via the visitor network, an authentication response; and
   providing, by the device and via the first communication protocol, the authentication response to enable the visitor network to authorize or deny a communication session associated with the UE.

2. The method of claim 1, wherein the first radio access technology is a New Radio technology and the second radio access technology comprises at least one of:
   a Global System for Mobile communication technology, or
   a Long-Term Evolution technology.

3. The method of claim 1, wherein the second communication protocol is a hypertext transfer protocol and the first communication protocol comprises at least one of:
   a Signaling System Number 7 (SS7) protocol, or
   a diameter protocol.

4. The method of claim 1, wherein the UE is determined to be authorized to communicate via the visitor network based on a message from the particular serving component indicating that the UE is subscribed for roaming via the visitor network.

5. The method of claim 1, wherein the authentication request is received from a roaming component of the home network,
   wherein the roaming component is configured to determine that the UE is subscribed to communicate via the first radio access technology.

6. The method of claim 1, wherein the authentication request is received based on a subscriber location function being accessed in association with the second radio access technology.

7. The method of claim 6, wherein the home network includes a primary network that utilizes the first radio access technology and a secondary network that utilizes the second radio access technology,
   wherein the subscriber location function is associated with the secondary network of the home network.

8. The method of claim 1, further comprising:
   detecting, when communicating with the particular serving component, an error associated with the second communication protocol; and
   determining an error response for the first communication protocol that corresponds to the error associated with the second communication protocol,
      wherein the authentication response includes the error response.

9. A device, comprising:
   one or more processors, configured to:
      receive, via a first communication protocol, an authentication request associated with authorizing a user equipment (UE) to engage in a communication session via a visitor network,
  wherein the UE is subscribed to communicate via a first radio access technology of a home network, and
  wherein the visitor network utilizes a second radio access technology;
identify an identifier associated with the UE in the authentication request;
determine, based on the identifier, the UE is subscribed to communicate via the first radio access technology;
determine, based on determining that the UE is subscribed to communicate via the first radio technology and a service mapping of the home network, a particular serving component from a plurality of serving components associated with the home network, that is configured to serve the UE;
request the particular serving component to provide authentication information that indicates whether the UE is authorized to engage in the communication session;
receive, from the particular serving component and via a second communication protocol, the authentication information; and
transmit an authentication response to the authentication request, in accordance with the authentication information, to permit the visitor network to manage the communication session.

10. The device of claim 9, wherein the first radio access technology is a New Radio technology and the second radio access technology is at least one of:
  a Global System for Mobile communication technology, or
  a Long-Term Evolution technology.

11. The device of claim 9, wherein the second communication protocol is a hypertext transfer protocol and the first communication protocol is at least one of:
  a Signaling System Number 7 (SS7) protocol, or
  a diameter protocol.

12. The device of claim 9, wherein the service mapping is maintained by a network function repository function of the home network and the particular serving component corresponds to a unified data management component of the home network.

13. The device of claim 9, wherein the authentication request is received from a roaming component of the home network,
  wherein the roaming component is configured to determine that the UE is subscribed to communicate via the first radio access technology based on a subscription locator function of the home network,
    wherein the subscription locator function is associated with communicating via the home network using the second radio access technology.

14. The device of claim 9, wherein the one or more processors are further configured to:
  extract the authentication information from an authentication message received from the particular serving component via the second communication protocol; and
  generate the authentication response based on the authentication information and the first communication protocol.

15. A non-transitory computer-readable medium storing instructions, the instructions comprising:
  one or more instructions that, when executed by one or more processors, cause the one or more processors to:
    receive, via a first communication protocol, an authentication request associated with a user equipment (UE),
      wherein the UE is subscribed to communicate via a first radio access technology of a home network, and
      wherein the authentication request is associated with enabling the UE to communicate via a visitor network that utilizes a second radio access technology;
    identify an identifier associated with the UE in the authentication request;
    determine, based on the identifier, the UE is subscribed to communicate via the first radio access technology;
    determine, based on determining that the UE is subscribed to communicate via the first radio access technology, a particular serving component, from a plurality of serving components associated with the home network, that is configured to serve the UE;
    obtain, from the particular serving component, authentication information associated with the UE,
      wherein the authentication information is obtained via a second communication protocol; and
    provide, based on the authentication information, an authentication response to the authentication request.

16. The non-transitory computer-readable medium of claim 15, wherein the first radio access technology is a New Radio technology and the second radio access technology is at least one of:
  a Global System for Mobile communication technology, or
  a Long-Term Evolution technology.

17. The non-transitory computer-readable medium of claim 15, wherein the second communication protocol is a hypertext transfer protocol and the first communication protocol is at least one of:
  a Signaling System Number 7 (SS7) protocol, or
  a diameter protocol.

18. The non-transitory computer-readable medium of claim 15, wherein the authentication request is received from a roaming component of the home network,
  wherein the roaming component is configured to determine that the UE is subscribed to communicate via the first radio access technology.

19. The non-transitory computer-readable medium of claim 15, further comprising one or more instructions that cause the one or more processors to:
  generate the authentication response based on the authentication information and the first communication protocol,
    wherein the authentication response is provided using the first communication protocol.

20. The non-transitory computer-readable medium of claim 15, wherein the authentication response permits the visitor network to:
  enable the UE to engage in a communication session via the visitor network when the authentication information indicates that the UE is associated with a roaming subscription associated with the visitor network, or
  prevent the UE from engaging in the communication session via the visitor network when the authentication information indicates that the UE is not associated with the roaming subscription associated with the visitor network.

* * * * *